United States Patent [19]
van der Lely

[11] Patent Number: 5,909,716
[45] Date of Patent: *Jun. 8, 1999

[54] APPARATUS FOR AND A METHOD OF MILKING ANIMALS

[76] Inventor: Cornelis van der Lely, 7 Brüschenrain, CH-6300 Zug, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/636,985

[22] Filed: Apr. 24, 1996

[30] Foreign Application Priority Data

Sep. 7, 1994 [NL] Netherlands ............................ 9401451

[51] Int. Cl.$^6$ ....................................................... A01J 3/00
[52] U.S. Cl. .................... 119/14.08; 119/14.1; 119/14.18
[58] Field of Search ................... 119/14.08, 14.1, 119/14.12, 14.18

[56] References Cited

U.S. PATENT DOCUMENTS

| | | | |
|---|---|---|---|
| 2,460,856 | 2/1949 | Stanke et al. | 119/14.12 |
| 4,726,322 | 2/1988 | Torsius | 119/14.14 |
| 4,838,207 | 6/1989 | Bom et al. | 119/14.02 |
| 5,042,428 | 8/1991 | Van der Lely et al. | 119/14.18 |
| 5,279,253 | 1/1994 | Lubberink | 119/14.08 |

FOREIGN PATENT DOCUMENTS

| | | |
|---|---|---|
| 0 069 560 A1 | 1/1983 | European Pat. Off. . |
| 0 545 916 A2 | 6/1993 | European Pat. Off. . |
| 966159 | 10/1950 | France . |
| 2 593 668 | 8/1987 | France . |
| 804383 | 4/1951 | Germany . |
| 2154849 | 9/1985 | United Kingdom . |

*Primary Examiner*—Aaron J. Lewis
*Assistant Examiner*—David J. Cho
*Attorney, Agent, or Firm*—Penrose Lucas Albright

[57] ABSTRACT

A milking robot has articulated arms extensible into a milking compartment or parlor to place a teat cup onto each of the animal's teats. Also extended from outside into the parlor is a further articulated arm that carries a detector for ascertaining the location of the animal's teats, such information being used to connect the teat cups automatically. An electromagnetic gripper at the end of each robot arm has a seat to match the teat cup's shell. Each teat cup is loosely connected to two cables. A generally vertical cable connects it to an upper part of the milking parlor. A generally horizontal cable extends from a corresponding teat cup carrier located outside the parlor. The teat cups are moved to be received by the animal's teats by the robot arms and grippers which are then withdrawn from the milking parlor. Teat cups dislodged from teats are supported in approximately an upright position by their vertical cables and are pulled to teat cup carriers outside the parlor by their horizontal cables. Flexible milk and vacuum conduits for the teat cups extend therefrom out of the milking parlor on each side, curving upwardly to be received by a connector block. Because the flexible milk and vacuum conduits are curved and the teat cups are connected only loosely by the upper and lower cables, the animal can move within limits while being milked.

24 Claims, 5 Drawing Sheets

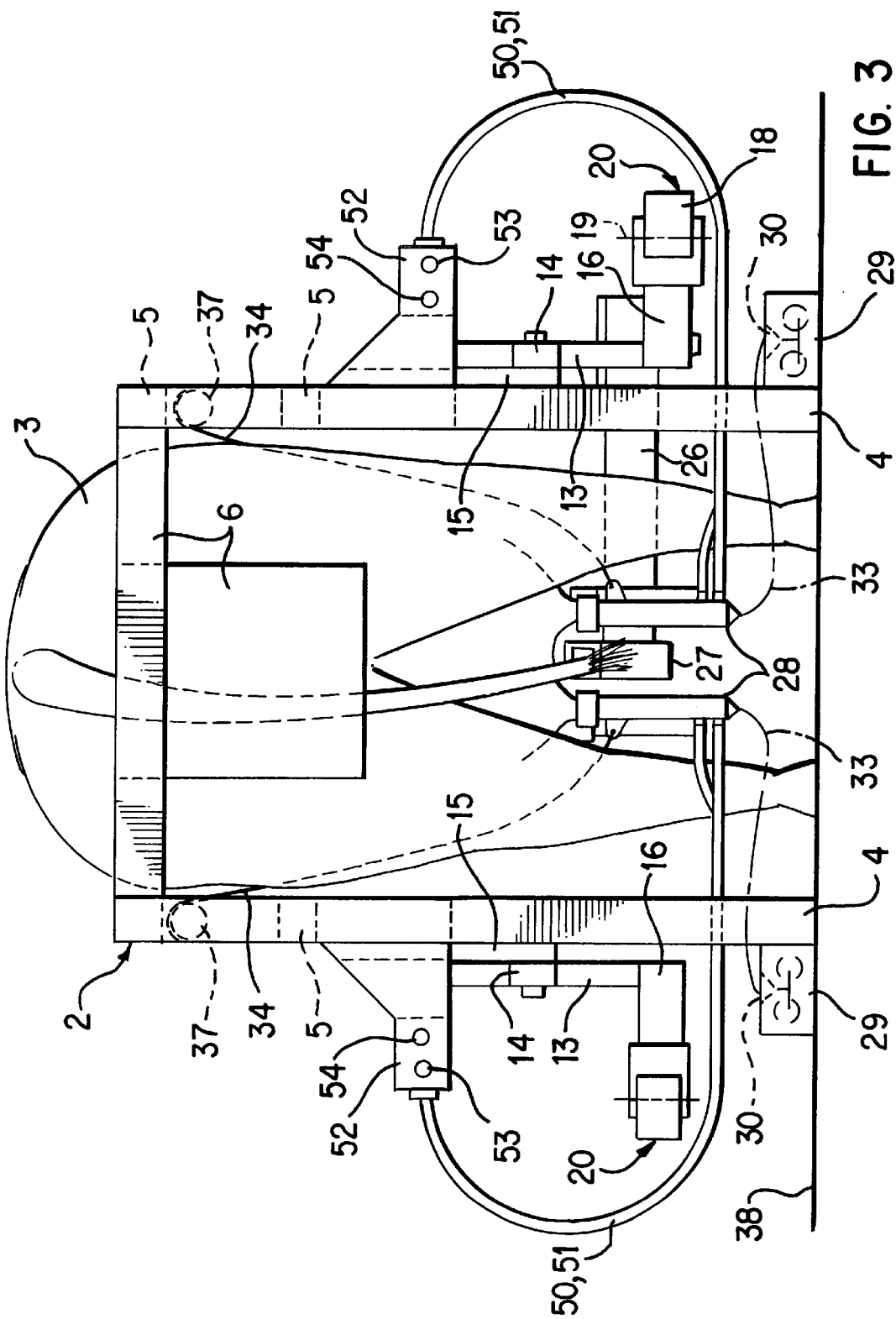

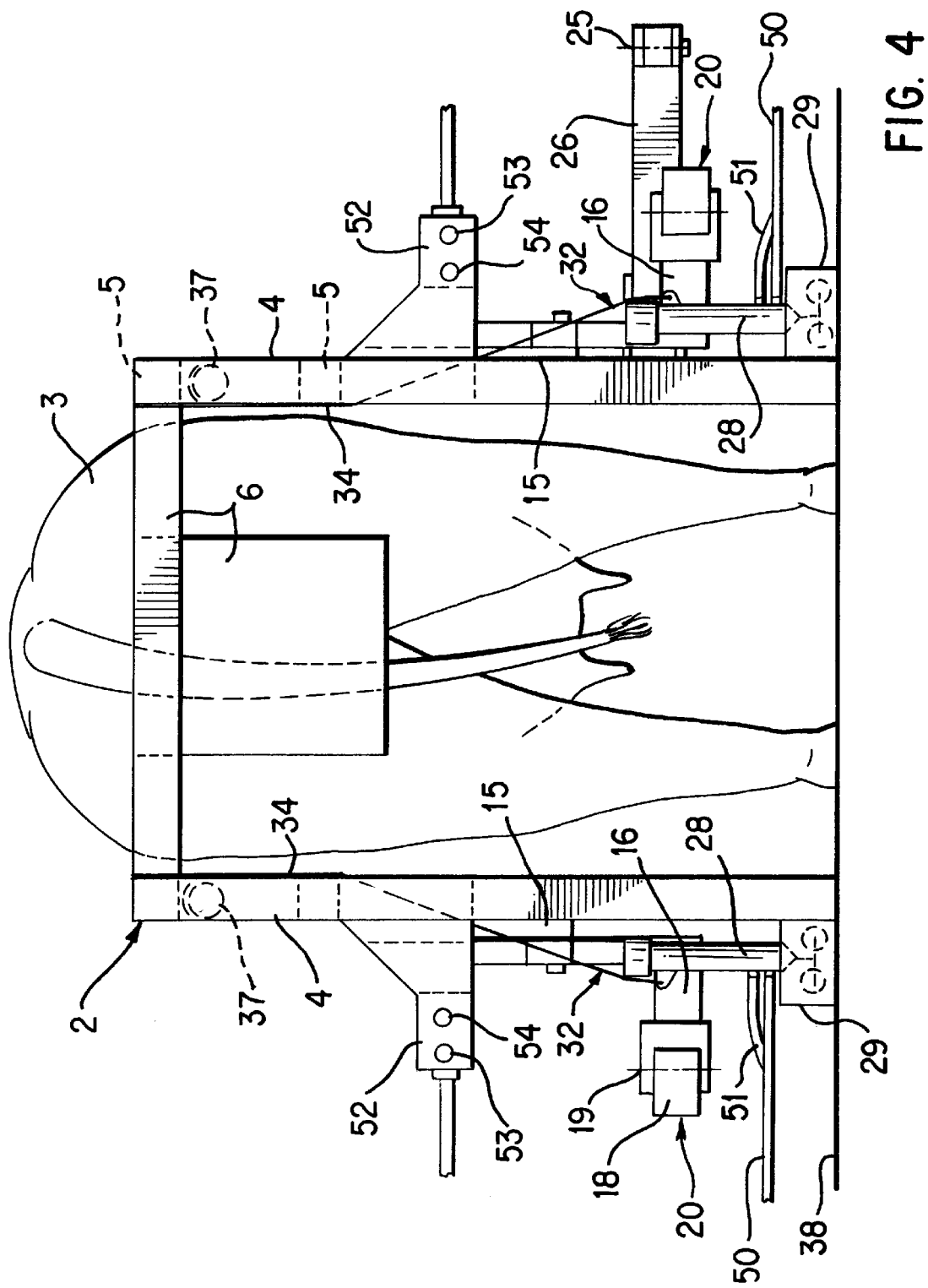

APPARATUS FOR AND A METHOD OF MILKING ANIMALS

FIELD OF THE INVENTION

The present invention relates to an apparatus for milking animals, such as cows, comprising one or more milking robots which connect and disconnect teat cups from the animal's teats. More particularly, it relates to a system of automatically milking the animals while they are confined in milking parlors, the teat cup being connected to the animal's teats in a manner that the animals can move within the confines of the milking parlors without the teat cups being accidentally disconnected due to the animal's movements.

BACKGROUND OF THE INVENTION

Types of apparatus for automatically milking animals are well known. However, with such types of milking apparatus it is not always possible to prevent the environment in which the milking robot is operating from becoming polluted. Especially the feces of the animals may be received on and pollute the floor of the milking parlor. In such case, should the upper ends of the teat cups come into contact with the floor of the milking parlor, the milk may be contaminated or otherwise deteriorated in quality. This is, of course, highly undesirable. Moreover, lower grade milk usually means the farmer receives a lower price.

SUMMARY OF THE INVENTION

The invention has for its objective to provide an apparatus of the above mentioned types where the danger of the milk being contaminated by the teat cups contacting the milking parlor's floor is eliminated or is at least considerably reduced.

According to the invention, this is achieved by providing each teat cup with one or more cables or similar means of transport, through the aid of which the teat cup during its movement to a teat cup carrier is retained in an approximately upright position.

According to a feature of the invention, the teat cup is continuously or virtually continuously retained in an approximately upright position when it is moving to the teat cup carrier and thereafter when it is being disconnected from a teat. By this means the upper end of the teat cup is not likely to contact the floor of the milking parlor and milk quality is, to this extent, improved. In an exemplary embodiment of the invention, the means of transport comprise at least two cables connected with the teat cup. Accordingly, the invention relates to an apparatus for milking animals, such as cows, using one or more milking robots which manipulate teat cups, and comprising one or more milking parlors, characterized in that each teat cup is provided with at least two cables connected therewith. According to a further feature of the invention, one cable extends essentially horizontally and the other extends essentially vertically. In this manner, the teat cups can be fastened in the apparatus in a simple, inexpensive, and reliable manner. According to a further feature of the invention, each teat cup is provided with cable fastening members, one near its upper end and the other near its lower end. Accordingly, the invention also relates to an apparatus for milking animals, such as cows, using one or more milking robots with teat cups and using one or more milking parlors, characterized in that each teat cup is provided with a cable fastening member near its upper end and another near its lower end. According to a further feature of the invention, the cable extending essentially vertically has one end connected with a further cable fastening member provided on the framework of the milking parlor and the other end connected with the cable fastening member provided near the upper side of the teat cup. According to a still further feature of the invention, the essentially horizontally extending cable has one end secured to a withdrawing member disposed near the framework of the milking parlor and the other end secured to the cable fastening member disposed near the underside of the teat cup. When the teat cup is to be disconnected from the teat, the relevant teat cup can then be moved virtually horizontally to a side of the milking parlor by means of a withdrawing member and the cables.

According to another feature of the invention, the cable fastening member for the essentially vertically extending cable is disposed on a frame beam extending in the longitudinal direction of the milking parlor. According to a yet further feature of the invention, the cable fastening is located approximately one-fourth of the total length of the milking parlor measured from its rear side. The aforementioned cable fastening is, according to still another further feature of the invention, disposed near the upper part of the framework milking parlor, preferably at a height of at least one meter as measured from the floor of the milking parlor.

According to another aspect of the invention, the cable fastening member for the essentially horizontally extending cable is disposed on the connection to the piston a pneumatic cylinder/piston unit of a withdrawing member. According to a further feature of the invention, the pneumatic cylinder/piston unit is disposed adjacent to the floor of the milking parlor and extends in the longitudinal direction of the milking parlor. In the exemplary embodiment of the invention, on both sides of the milking parlor two cylinder/piston units are provided, each comprising a cable fastening member.

According to a further feature of the invention, the apparatus comprises stands where the teat cups are placed upon completion of their milking function and further comprises at least two robot arms, each provided with a gripper, with the aid of which the teat cups can be coupled to the teats. Accordingly, the invention further relates to an apparatus for milking animals, such as cows, using one or more milking robots for connecting and disconnecting the teat cups and using one or more milking parlors, characterized in that the apparatus comprises stands where the teat cups are placed upon completion of the milking operation and at least two robot arms provided with a gripper, with the aid of which the teat cups are coupled to their corresponding teats. In the exemplary embodiment of the invention, in connection with this feature of the invention, on each longitudinal side of the milking parlor a robot arm is provided. The two robot arms are capable of acting simultaneously and, accordingly, are capable of connecting two teat cups simultaneously. In this manner, in a relatively short time the teat cups can be connected to the teats of an animal to be milked.

In order to obtain a sound coupling between a gripper and a teat cup, the gripper comprises an electromagnet and is provided with a seating recess curved to correspond with the shell of a teat cup. The teat cup is capable of being firmly and rapidly captured simply by energizing the electromagnet, and it is disengaged by simply de-energizing the electromagnet.

According to a further feature of the invention, the stands where the teat cups are placed upon completion of the milking operation comprise a holder provided with a conical seating corresponding with the conical shape of the underside of the teat cup. By means of the conical seating it is possible to receive a teat cup in the same position on the holder each time after milking. Due to the fact that the teat cups are arranged in a predefined position of rest on the holder, the teat cups are capable of being captured simply and efficiently by the gripper. According to a feature of the invention, a holder having two seatings so as to receive two teat cups is disposed close to each longitudinal side of the milking parlor.

According to still another aspect of the invention, near the central portion of the seating in the holder there is provided a hole, through which the essentially horizontally extending cable is led, the arrangement being such that within the holder the cable extends in the longitudinal direction of the milking parlor to the cable fastening arrangement of the pneumatic cylinder/piston unit.

According to yet a further feature of the invention, the apparatus comprises a robot arm equipped with a detector, such as a laser sensor, to locate the positions of the teats of an animal to be milked.

BRIEF DESCRIPTION OF THE DRAWINGS

The invention will now be further explained with reference to the accompanying drawings, in which:

FIG. 3 is a rear elevational view of the apparatus for milking animals during operation, as seen in the direction of the arrow III in FIG. 1;

FIG. 4 is a rear elevational view of the apparatus for milking animals, as shown in FIGS. 1 and 2, in non-operating condition;

DESCRIPTION OF THE PREFERRED EMBODIMENT

Figure 1:
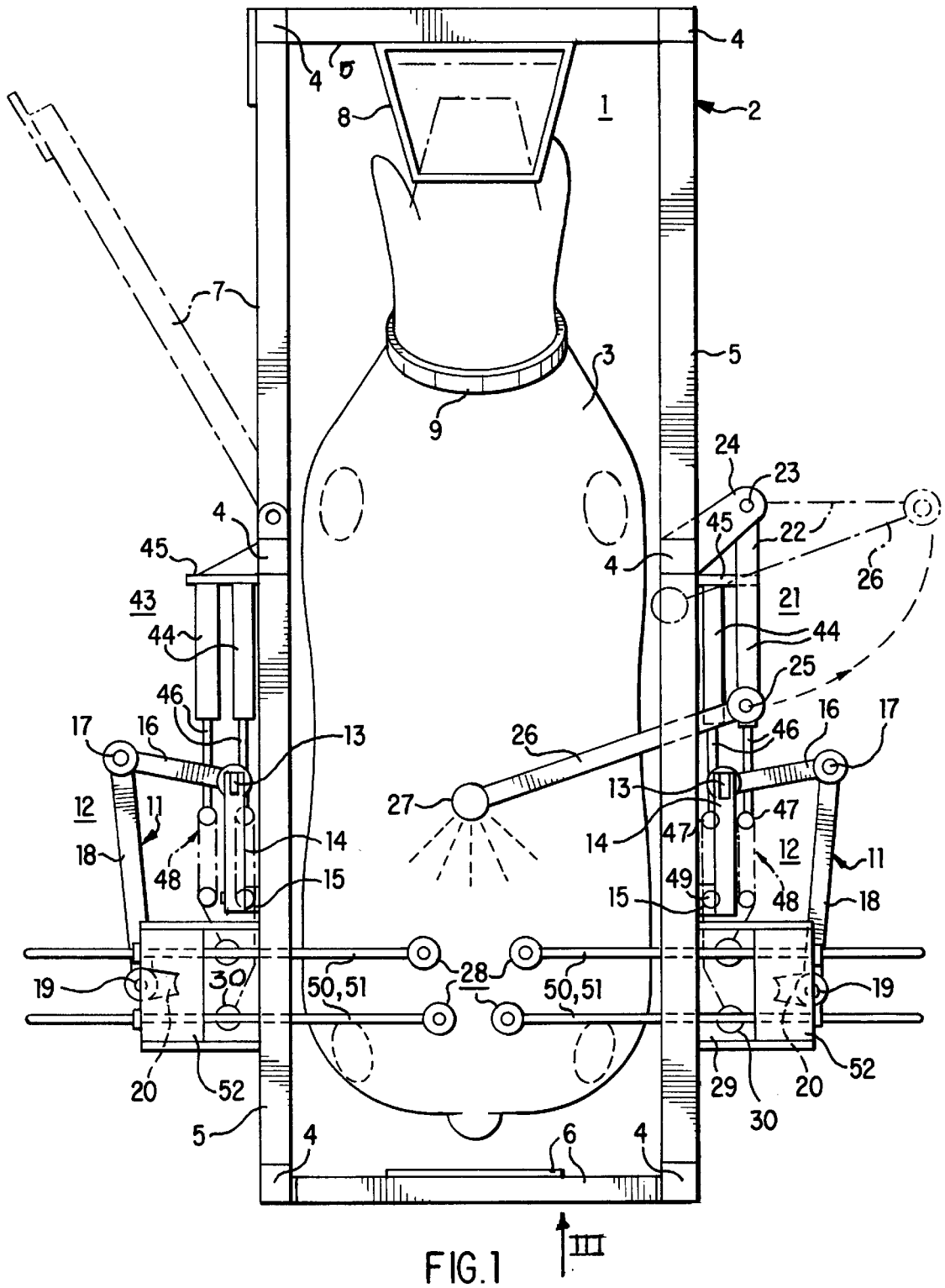
FIG. 1 is a plan view of an apparatus for milking animals, which is provided with a milking robot having on each of its longitudinal sides a gripper for capturing the teat cups.
Figure 2:
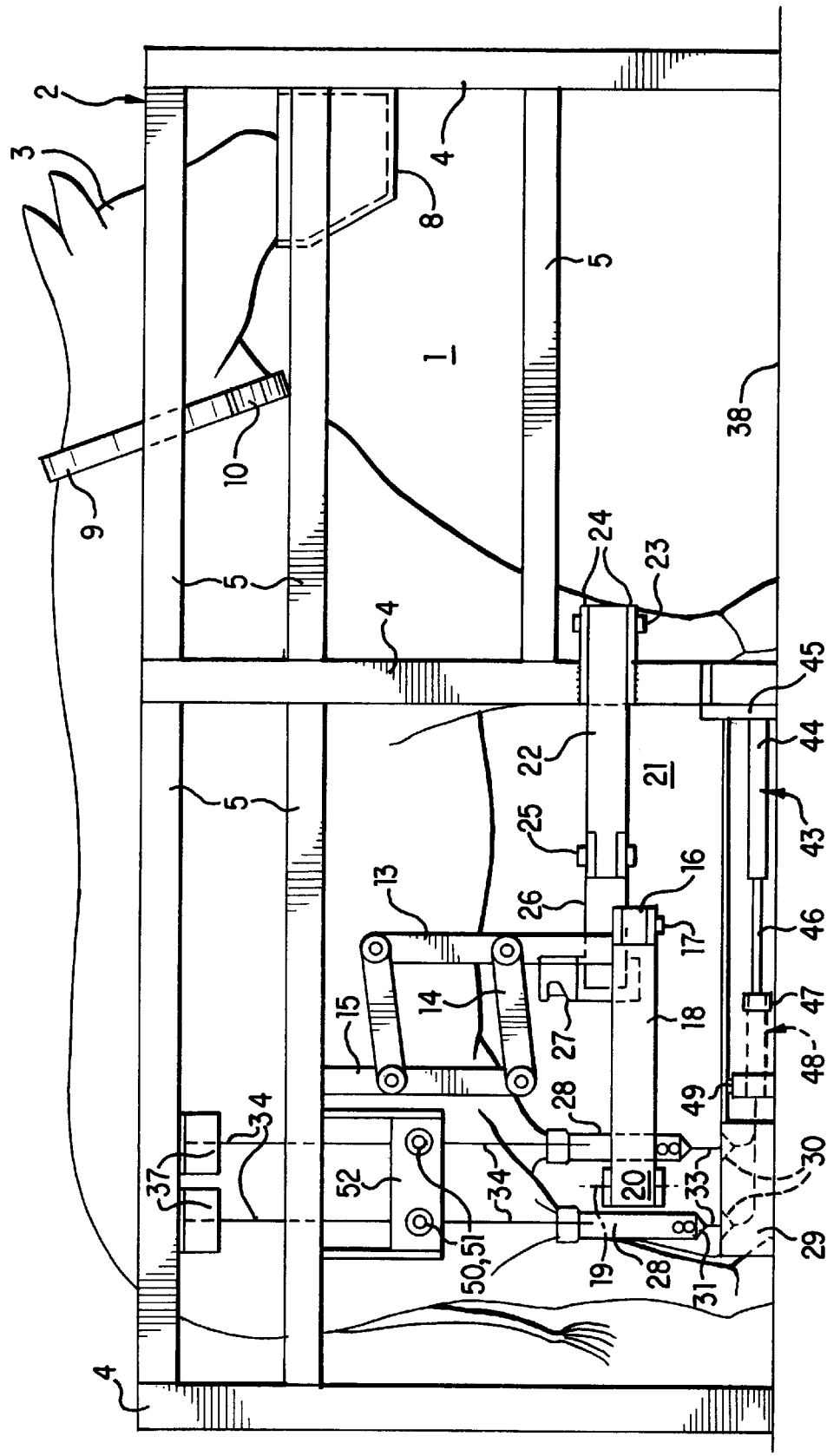
FIG. 2 is a side elevational view of the apparatus for milking animals according to FIG. 1, where the means of transport, through which the teat cups are retained in an upright attitude when travelling, are clearly visible.

FIG. 1 shows a plan view of a milking parlor 1 with a frame 2 enclosing an animal 3, a cow in the present case. As is depicted in FIG. 2, frame 2 comprises posts 4 and, between them, cross-beams 5 spaced from and parallel to each other. Milking parlor 1 is provided with an entrance gate or door 6 on the rear side and an exit gate or door 7 on the longitudinal port side. On a cross-beam 5 near the front side of milking parlor 1 there is also provided a feed trough 8 wherein animal 3 is fed concentrates. For identification, animal 3 is provided a collar 9 around her neck having a transmitter 10 which operates in conjunction with an animal recognition system (not shown).

In conjunction with milking parlor 1 there is a milking robot 11 which comprises a robot arm 12 on each longitudinal side of milking parlor 1. On robot arm 12 is a vertical support 13 which is connected with a parallelogram-type hinged arm construction 14. The other end of the parallelogram-type hinged arm construction 14 is connected with a vertically disposed supporting beam 15 connected with a cross-beam 5 of frame 2. Robot arm 12 is capable of being moved vertically by means of a cylinder/piston combination (not shown). Robot arm 12 comprises a first arm part 16 and a second arm part 18 capable of pivoting relative to first arm part 16 about a vertical shaft 17. On the end of the second arm part 18, a gripper 20 is capable of rotating about a vertical shaft 19. A further robot arm 21 is mounted on the longitudinal starboard side of milking parlor 1 which is opposite to exit door 7. The further robot arm 21 comprises a first arm part 22, one end of which is pivotably mounted on a vertical shaft 23 of a fork 24 fixedly connected to a post 4 of milking parlor 1. The other end of the first arm part 22 is pivotably connected via a vertical shaft 25 with a second arm part 26, the outer end of which is provided with a detector or sensor 27 for finding the teat positions of animal 3. In the present embodiment of the invention, sensor 27 is a laser detector and is capable of being swung through an angle of approximately 150°.

Further, milking robot 11 is equipped with four teat cups 28, which are arranged on teat cup carriers 29 (FIG. 4) in pairs on both sides of the milking parlor when milking robot 11 is not in use for the milking operation. Each teat cup carrier or holder 29 is provided with two conical seatings 30, each corresponding with the lowermost conical part of a teat cup 28. In the present exemplary embodiment, a holder 29 is provided on the floor along the two longitudinal sides of milking parlor 1, each holder 29 having two conical recesses 30 situated one behind the other as seen in the longitudinal direction of milking parlor 1.

Figure 5:
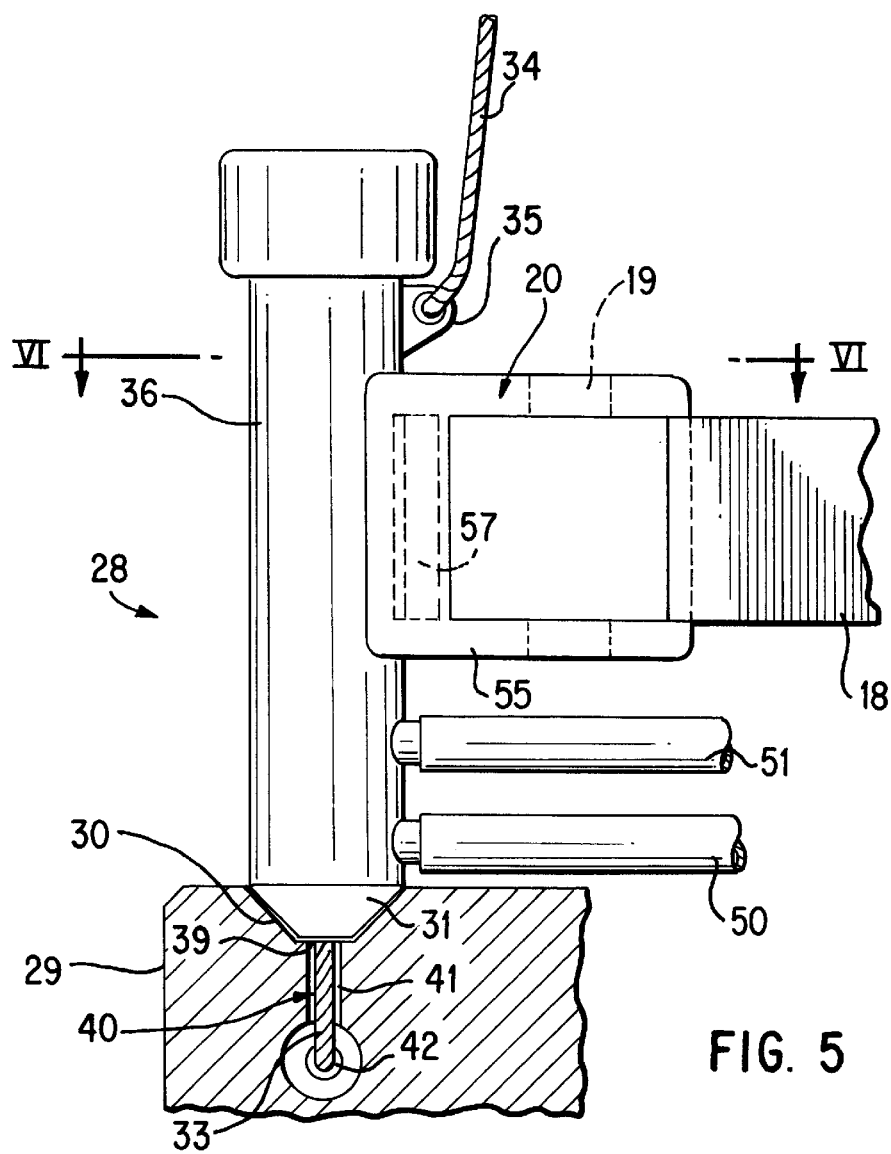
FIG. 5 shows in side elevation an enlargement of a detail of the gripper of the milking robot as well as a teat cup.

Each teat cup 28 is also provided with transport means generally designated by reference numeral 32, with the aid of which the respective teat cup 28 is retained continuously or virtually continuously in an approximately vertical position during its movement to the teat cup carrier 29 and during its disconnection from the teat. As seen in FIGS. 3 and 4, each transport means 32 comprises a cable 33 extending essentially horizontally and a cable 34 extending essentially vertically. Each vertical cable 34 has one end connected with a cable fastening projection 35 which is disposed near the top side of the teat cup 28, on the shell 36 of teat cup 28 (FIG. 5). The other end of each vertical cable 34 is connected with a cable fastening member 37, four of which depend from starboard and port upper cross-beams 5 of frame 2. Each cable fastening 37 is a cylindrical body which also constitutes a guide for the upper end of vertical cable 34. The length of each vertical cable 34 is dimensioned so that the upper part of the associated teat cup 28 can not come into contact with floor 38 of milking parlor 1. In the conical part 31 of the underside of each teat cup 28, a cable fastening connection 39 is provided, by means of which one end of the associated horizontal cable 33 is connected with teat cup 28. As is shown in FIG. 5, the horizontal cable 33 passes through a vertical hole 40 in the teat cup carrier 29. Hole 40 has a first vertical part 41 which is provided in the center of the conical seating 30 and, perpendicular to the first part 41, hole 40 has a second part 42 extending in the longitudinal direction of milking parlor 1. The two horizontal cables 33 of one pair of teat cups 28 leave the teat cup carrier 29 approximately parallel to each other and extend in the longitudinal direction of the milking parlor to the withdrawing members 43. In the present exemplary embodiment of the invention, withdrawing members 43 are designed as pneumatic cylinder/piston combinations, but they may also be hydraulic cylinder/piston combinations or electric equivalents thereof. On each longitudinal side of milking parlor 1, in the exemplary embodiment of the invention, there are provided two pneumatic cylinder/piston combinations 44 side by side and parallel to each other. The cylinder/piston combinations 44 have the rear side of the cylinder housing connected with a plate 45 fixedly connected with a post 4 of frame 2. The end of the piston rod 46 extending from the pneumatic cylinder/piston combination 44 comprises a cable fastening device to which the horizontal cable 33 is fastened. In order to be able to make pneumatic cylinder/piston combination 44 as compact as possible in the apparatus and still to be able to pay out the horizontal cable sufficiently, a pulley mechanism 48 is used in the present embodiment of the invention. The pulley mechanism 48 comprises a roller guide designed as a cable fastening component 47 surrounded by the horizontal cable 33 disposed in a loop and a vertical shaft 49, to which the end of horizontal cable 33 is fastened.

Each of teat cups 28 is further provided with a milk tube 50 and a pulsation tube 51, which extend from the associated teat cup 28 in a loop, transversely to the longitudinal direction of milking parlor 1, to a collector block 52, one of which is supported on each side from a cross-beam 5. The loops in each milk tube 50 and the pulsation tube 51 are dimensioned that teat cups 28 are capable of moving from the position of rest on the teat cup carrier 29 as shown in FIG. 4 to underneath the udder of animal 3 as shown in FIG. 3. Because tubes 50 and 51 are fastened to teat cups 28 through a loop, the animal can move within the limits of frame 2 during milking without the teat cups 28 being disconnected. Each collector block 52 is furthermore provided with a milk discharge line 53 for removing the milk it receives via tubes 50 and a vacuum line 54 for the vacuum required during milking.

Figure 6:
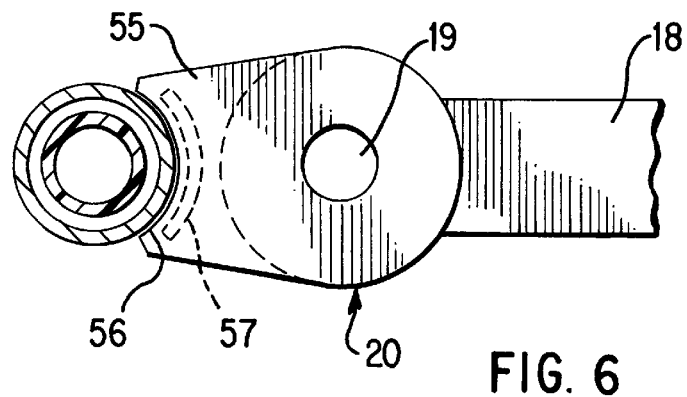
FIG. 6 is a top sectional view of the gripper and teat cup taken on the line VI—VI in FIG. 5.

Gripper 20 comprises a block-shaped holder 55 which is rotatable about the vertical shaft 19 and which is, at its outer end, provided with a recess 56 (FIGS. 5 and 6) curved in accordance with shell 36 of a teat cup 28. In the vicinity of curved recess 56, in the block-shaped holder 55, a curved electromagnet 57 is provided which may be selectively energized.

The operation of the apparatus for milking animals as set forth hereinbefore is as follows:

After an animal 3 has entered milking parlor 1 through entrance door 6, animal 3 is automatically identified by the animal recognition system by means of the transmitter 10. After animal 3 has been identified by the animal recognition system, fodder concentrates in the feed trough 8 are provided to animal 3. Subsequently, by means of a computer, robot arm 21 with laser detector 27 thereon, is swung to underneath the animal and, by means of laser detector 27, the positions of the teats of the animal are determined and data thereof is transmitted to the computer. Then the computer issues one or more signals to the two robot arms 12 which are disposed respectively on the two longitudinal sides of milking parlor 1 and which, acting on the basis of these signals, cause the curved recesses 56 of grippers 20 to move close to associated shells of teat cups 28. In the present embodiment of the invention, first, those teat cups 28 to be connected to the hind teats of animal 3 to be milked are engaged by the corresponding grippers 20. Even before the curved recess 56 of a block-shaped holder 55 comes near to the shell 36 of the corresponding teat cup 28, the computer issues a signal to the electromagnet 57 so as to produce a magnetic field in the vicinity of curved recess 56 of gripper 20. When gripper 20 approaches sufficiently near to metal shell 36 of a teat cup 28, that teat cup 28 is firmly drawn against curved recess 56 of the block-shaped holder 55 owing to the presence of the magnetic field. A change in the magnetic field generated by electromagnets is caused by the metal shell 36, whereupon a signal is transmitted to the computer to the effect that the associated teat cup 28 has been coupled. The last mentioned signal can also be issued by a different type of sensor, such as a contact sensor, which is disposed in the block-shaped holder 55 or by means of a position determination through the detector 27.

The computer then transmits a signal to transport means 32 for the relevant teat cup 28 which activates the pneumatic cylinder/piston combination 44, whereupon teat cup 28 is lifted from its seating 30 in teat cup carrier 29 by means of the robot arm 12 without being held back by the horizontal cable 33. Subsequently, the relevant teat cups 28 are moved horizontally to underneath the hind teats of animal 3 (FIG. 3). As each teat cup 28 moves to proximate its corresponding teat, its attached vertical cable 34 swings along with that teat cup 28 and the relevant horizontal cable 33 is also carried along. By means of gripper 20, teat cup 28 is then connected to the appropriate teat of an animal 3 to be milked, whereupon the milking of the relevant udder quarter may start. During milking, horizontal cable 33 depends somewhat, having sufficient slack so that teat cup 28 can move within limits when animal 3 moves during milking.

After teat cups 28 have been connected to the hind teats, the robot arms 12 with their grippers 20 engage the remaining two teat cups 28 and emplace them on fore teats in a manner similar to doing so with the hind teats. After it has been detected by means of a sensor (not shown) that an udder quarter is empty, the computer issues a signal to the relevant pneumatic cylinder/piston combination 44, whereupon this cylinder/piston combination 44 is energized, with the result that the corresponding horizontal cable 33 is pulled and draws the teat cup 28 to seating 30 of teat cup carrier 29. During its motion to teat cup carrier 29, each teat cup 28 is retained in an approximately upright attitude by vertical cable 34. This prevents the top side of teat cup 28 from coming into contact with the possibly contaminated floor 38 of the milking parlor. After all teat cups 28 have been thus disconnected from the teats of the animal 3 to be milked, exit door 7 is opened and the animal 3 is allowed to leave milking parlor 1, whereupon another animal is permitted to enter milking parlor 1 and the teat cups 28 can again be connected to the animal so received in milking parlor 1, which is then milked.

Although the preferred embodiments of the invention are disclosed herein, it is to be understood that the invention is capable of other adaptations and modifications within the scope of the appended claims.

Having disclosed my invention, what I claim as new and to be secured by Letters Patent of the United States is:

1. An apparatus for milking animals, such as cows, comprising at least one milking robot including teat cups, each of which has an upper aspect and a lower aspect, and at least one milking parlor, each teat cup being provided with at least one corresponding cable which depends generally vertically from a corresponding fastening member that is mounted adjacent an animal being milked in said milking parlor and which is connected to said upper aspect of said corresponding teat cup, a teat cup holder for holding each said teat cup when it is not received by the animal's teat, horizontally extending flexible transport means connected to the lower aspect of each said teat cup for independently moving each said teat cup from the animal's teat to said teat cup holder, each said cable retaining said corresponding teat cup in approximately an upright position during the movement of said corresponding teat cup to said teat cup holder.

2. An apparatus according to claim 1 wherein each said teat cup is virtually continuously retained in an approximately upright position when it is moving to the teat cup holder and when it is being disconnected from a teat.

3. An apparatus in accordance with claim 1, wherein said transport means comprises further cables each of which is connected with said corresponding teat cup.

4. An apparatus in accordance with claim 1, comprising a withdrawing member, each said cable that extends essentially horizontally interconnecting the lower end of the corresponding said teat cup and said withdrawing member.

5. An apparatus in accordance with claim 4, wherein said withdrawing member includes a pneumatically operated cylinder/piston combination, said essentially horizontally extending cable being interconnected with said pneumatically operated cylinder/piston combination.

6. An apparatus in accordance with claim 5, wherein said milking parlor comprises a floor, said pneumatically operated cylinder/piston combination being disposed adjacent said floor and extending in longitudinal direction of said milking parlor.

7. An apparatus in accordance with claim 6, wherein there are at least four of said pneumatically operated cylinder/piston combinations disposed adjacent to the floor of said milking parlor, two of said pneumatically operated cylinder/piston combinations being disposed on each side of said milking parlor.

8. An apparatus in accordance with claim 1, wherein said milking robot comprises at least two robot arms each of which has gripper for selectively engaging and supporting said one teat cup and a further teat cup while they are emplaced on the teats of the animal.

9. An apparatus in accordance with claim 8, wherein said milking parlor comprises two longitudinal sides and one of said robot arms is disposed on each said longitudinal side of said milking parlor.

10. An apparatus in accordance with claim 8, wherein each said gripper comprises a recess which is curved to conform with a shell of said one teat cup and a shell of said further teat cup respectively.

11. An apparatus in accordance with claim 10, wherein each said gripper comprises an electromagnet.

12. An apparatus in accordance with claim 10, wherein said teat cup holder comprises conical seatings which correspond with a conical configuration provided on an underside of each said one teat cup.

13. An apparatus in accordance with claim 12, wherein said milking parlor comprises two longitudinal sides, and each said holder comprises two conical seatings, said holder being disposed on one longitudinal side of said milking parlor and a further similar holder having two conical seatings being disposed on the other longitudinal side of said milking parlor.

14. An apparatus in accordance with claim 12, wherein said conical seating comprises a centrally disposed hole, said transport for moving said one teat cup comprising an essentially horizontally extending cable, said cable being received through said hole and being connected to said one teat cup.

15. An apparatus in accordance with claim 1, wherein said milking robot comprises detector means for locating the positions of the teats of the animal to be milked.

16. An apparatus in accordance with claim 1, wherein said cable extends vertically adjacent to the sides of an animal above the animal's udder in said milking parlor.

17. An apparatus in accordance with claim 1, wherein said transport means for moving each said teat cup comprises a further cable, each said teat cup interconnecting a corresponding said further cable and said first mentioned cable.

18. An apparatus for milking animals, such as cows, comprising at least one milking robot, a plurality of teat cups and a milking parlor, each said teat cup being independently directly connected to at least two cables for supporting and moving said teat cup within said milking parlor from the animal's teat to which the teat cup has been connected to a holder for the teat cup, said holder being disposed at a side of said milking parlor.

19. An apparatus in accordance with claim 18, wherein one of said two cables is supportingly connected to each said teat cup and extends substantially vertically upwardly therefrom.

20. An apparatus in accordance with claim 19, wherein said teat cup has a lower end and an upper part, and each said cable that extends essentially horizontally is connected to the corresponding said teat cup near its said lower end and each said other cable which extends substantially vertically is connected to said upper part of the corresponding said teat cup.

21. An apparatus in accordance with claim 20, wherein each said other cable that extends substantially vertically has an upper aspect and is connected by said fastening means at its said upper aspect to a frame defining said milking parlor.

22. An apparatus in accordance with claim 19, wherein said milking parlor comprises a frame which includes a frame beam extending in the longitudinal direction of said milking parlor, a cable fastening member disposed on said frame beam, each said cable having an upper end that extends substantially vertically, each said cable comprising an upper aspect and being connected at its said upper aspect to said cable fastening member.

23. An apparatus in accordance with claim 22, wherein said milking parlor comprising a floor, an animal therein supported by said floor having an udder, and wherein said frame where each said fastening member is disposed thereon is a vertical distance above the floor of said milking parlor which is approximately eighty percent of the animal's height measured vertically in a transverse plane containing the udder of the animal.

24. An apparatus in accordance with claim 18, wherein said teat cup is moved by one of said cables while being supported by the other of said cables.

\* \* \* \* \*